US006981825B2

(12) United States Patent
Sugata et al.

(10) Patent No.: US 6,981,825 B2
(45) Date of Patent: Jan. 3, 2006

(54) MULTISPINDLE MACHINE TOOL AND METHOD OF OPTIMIZING LUBRICANT MIST FLOW FOR EACH SPINDLE OF MULTISPINDLE MACHINE TOOL

(75) Inventors: Shinsuke Sugata, Fukuyama (JP); Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 73 days.

(21) Appl. No.: 10/486,551

(22) PCT Filed: Aug. 9, 2002

(86) PCT No.: PCT/JP02/08205

§ 371 (c)(1),
(2), (4) Date: Feb. 10, 2004

(87) PCT Pub. No.: WO03/013786

PCT Pub. Date: Feb. 20, 2003

(65) Prior Publication Data

US 2004/0191012 A1      Sep. 30, 2004

(30) Foreign Application Priority Data

Aug. 10, 2001   (JP)   .............................. 2001-243222

(51) Int. Cl.
   *B23C 9/00*   (2006.01)
   *B23Q 11/10*  (2006.01)
(52) U.S. Cl. ........................... 409/136; 408/59; 408/56
(58) Field of Classification Search ................ 409/136, 409/135; 408/56–61; 184/6.14, 6.26, 55.1
See application file for complete search history.

(56) References Cited

U.S. PATENT DOCUMENTS

| 5,676,506 A | * | 10/1997 | Sugata ......................... 409/136 |
| 6,899,496 B2 | * | 5/2005 | Sugata et al. ............... 409/136 |
| 6,905,294 B2 | * | 6/2005 | Sugata et al. ............... 409/136 |

FOREIGN PATENT DOCUMENTS

| JP | 9-66437 | 3/1997 |
| JP | 11-235641 | 8/1999 |
| JP | 3316680 | 6/2002 |

* cited by examiner

*Primary Examiner*—Erica Cadugan
(74) *Attorney, Agent, or Firm*—Merek, Blackmon & Voorhees, LLC (57) ABSTRACT

A multispindle machine tool, characterized in that outside cylindrical members (19) having a plurality of spindles (2) and fixed to a support frame (3b) are inserted into the center holes (2c) of the spindles, a mist generator (22) for generating lubricant mist in the spindles and inside cylindrical members (20) having the mist generator fixed to the tip thereof are installed on the inside of the outside cylindrical members so as to be withdrawn the outside cylindrical members held in fixed state so that, under the installed state, the mist generator can generate the lubricant mist since compressed air and liquid lubricant are separately fed from the outsides of the spindles thereto through the outside cylindrical members and the inside cylindrical members and the inside cylindrical members and, under the withdrawn state, the lubricant mist is fed from the outsides to the insides of the spindles through the outside cylindrical members to jet out the mist from the tips of the cutters fixed to the tips of the spindles, whereby a mist generation system can be changed from an internal mist generating system to an external mist feed system by a simple operation, and the optimization operation for the flow of the jetted lubricant mist can be performed rapidly at a row cost.

6 Claims, 4 Drawing Sheets

MULTISPINDLE MACHINE TOOL AND METHOD OF OPTIMIZING LUBRICANT MIST FLOW FOR EACH SPINDLE OF MULTISPINDLE MACHINE TOOL

TECHNICAL FIELD

The present invention relates to a multispindle machine tool and a method of optimizing lubricant mist flow for each of the spindles thereof.

DESCRIPTION OF THE PRIOR ART

There exists a multispindle machine tool having a plurality of spindles, each spindle having a cutter fixed on the tip, lubricant mist feed to the cutter, and the mist spout from the tip of the cutter.

In this kind of machine tool, it is important for rational machining that each spindle spouts the lubricant mist at optimum flow.

There are two public systems that the applicant has already proposed and announced officially as a method for spouting lubricant mist from the tip of a cutter of a machine tool.

One is an external mist feed system for feeding lubricant mist from the outside into a spindle and flowing out it from the tip of the cutter fixed to the tip of the spindle. The other is an internal mist generating system for feeding liquid lubricant and compressed air from the outside into the spindle separately, generating lubricant mist through a mist generator inside the spindle, and flowing out the mist from the tip of the cutter fixed to the tip of the spindle.

The feature of each of the systems will be explained as following As for the internal mist generating system, since the quantity of the lubricant jetted from the cutter is optionally established, all machining is possible. However, the structure is complicated and the cost is high. On the other hand, as for the external mist feed system, since the structure is comparatively simple, the cost is low. However, since the lubricant mist is fed to the tip of the cutter through a long pipeline, a transportable quantity of the lubricant mist is little. Therefore, only simple machining such as shallow-hole machining is carried out.

Accordingly, for rational machining of the machine tool, it is desirable to adopt the external mist feed system to a spindle not needing much lubricant mist for machining, and the internal mist generating system to a spindle needing much lubricant mist for machining.

However, practically, there is a lot of machining that the most suitable flow of lubricant mist for each spindle is unknown, and it is almost impossible to put the spindle in the two systems from the beginning.

Accordingly, almost conventional multispindle machine tools adopt the internal mist generating system to the spindles for all machining.

When the conventional multispindle machine tools practically machine works, some spindles are sometimes changed from the internal mist generating system to the external mist feed system, or they are sometimes reversed after their change to carry out rational machining due to optimizing the flow of lubricant mist of each spindle. However, thus clanging operation needs much time and money because of the structure of each spindle.

The invention aims to make lubricant mist jet from cutters fixed to the spindles at the most suitable flow conveniently and inexpensively.

SUMMARY OF THE INVENTION

A multispindle machine tool is so constructed that a spindle head comprising a main body frame and a support flame provided behind the main body frame, a plurality of spindles are rotatably arranged in a longitudinal direction, supporting members for supporting passage means inserted to the centers of the spindles are installed on the supporting frame, outside cylindrical members for being inserted into center holes of the spindle head are fixed to the supporting members, mist generators for generating lubricant mist inside the spindle, and inside cylindrical members fixed the mist generators on the tips are installed on the insides of the outside cylindrical members so as to be withdrawn backward with the outside cylindrical members held in fixed state so that, under the installed state, the mist generators generate the lubricant mist due to separately feeding compressed air and liquid lubricant from the outsides through the outside cylindrical members and the inside cylindrical members and, under the withdrawn state, the lubricant mist is fed from the outsides to the insides of the spindles through the outside cylindrical members to jet out the mist from the tips of the cutters fixed to the tips of the spindles.

According to this invention, since the mist generators and the inside cylindrical members are installed so as to be withdrawn backward with the outside cylindrical members held in fixed state, each spindle can be simply switched to the internal mist generating system or the external feed system. Accordingly, the flow of lubricant mist jetted from the spindle can be simply optimized.

Besides, this invention will be materialized as follows. The rear ends of the outside cylindrical members are supported to the support frame through supporting members, and fitting members combined to the rear ends of inside cylindrical members are fixedly bolted to the supporting members. Under the state that the fitting members are taken away from the supporting members, backward withdrawing force is given to the fitting members. Therefore, the mist generators and the inside cylindrical members are backward withdrawn without regulating the relative displacement to the outside cylindrical members or the spindles.

According to this, since the fitting members are taken away from the supporting members and the backward withdrawing force is given to the fitting members, the spindles corresponding to the fitting members conveniently adopt the external mist feed system. Conversely, since the mist generators and the inside cylindrical members are inserted into the outside cylindrical members and the fitting members are fitted to the supporting members, the spindles corresponding to the fitting members adopt the internal mist generating system.

Moreover, the multispindle machine tool of the invention adopts two systems, and optionally selects either of them. Among a plurality of spindles having cutters fixed on the tips, some spindles adopt the external mist feed system that lubricant mist is fed from the outside and the mist flows out from the tips of the cutters. The others adopt the internal mist generating system that liquid lubricant and compressed air are separately fed into each spindle, a mist generator provided inside the spindle generates lubricant mist, and the lubricant mist is flowed out from the tips of the cutters. According to this invention, the spindles can conveniently and speedy adopt either of the two systems.

Furthermore, the multispindle machine tool of the invention can select either of the external mist feed system and the internal mist generating system due to installing or uninstalling a few components. In this case, these feed devices are connected to the spindles through pipe arrangements so as to correspond to the selected system.

According to this invention, the spindles can conveniently and speedy adopt either of the two systems. Since the pipe arrangements are suitably formed between the spindles and the outside feed devices, the lubricant mist is fed into the spindles from the external mist feed device or the external gas-liquid separate feed device corresponding to the selected system. Accordingly, the flow of the lubricant mist jetted from the spindles can be simply optimized.

Next, a method of optimizing lubricant mist flow for each spindle of the multispindle machine tool related to the present invention is made as follows.

When optimizing the flow of the lubricant mist flowed out from the spindles of the multispindle machine tool, at first, the internal mist generating system is selected to all of the spindles, under this state, work machining is carried out, and an optimum quantity of lubricant mist is fed from the corresponding external gas-liquid separate feed device into the spindles. In this case, each of the spindles is measured in the fed quality of liquid lubricant, and decided in either of systems according to the measurement. Besides, in each spindle of the external mist feed system, the lubricant mist is fed from a single external mist feed device through the pipeline, and a flow restriction means is intervened in the middle of a pipeline so that the optimum quantity of lubricant mist is fed.

According to this invention, the optimum flow of lubricant mist of each spindle is rapidly and exactly understood due to the external gas-liquid separate feed device. And the spindle is decided in the corresponding system according to the result, thereby adopting the system conveniently and rapidly. In the spindles corresponding to the external mist feed system, the flow of lubricant mist is much strictly optimized through the flow restriction means. Therefore, rational work machining can be accomplished simply, rapidly and at a low cost.

PREFERRED EMBODIMENT OF THE INVENTION

The present invention will be explained particularly with reference to the drawings.

Figure 1:
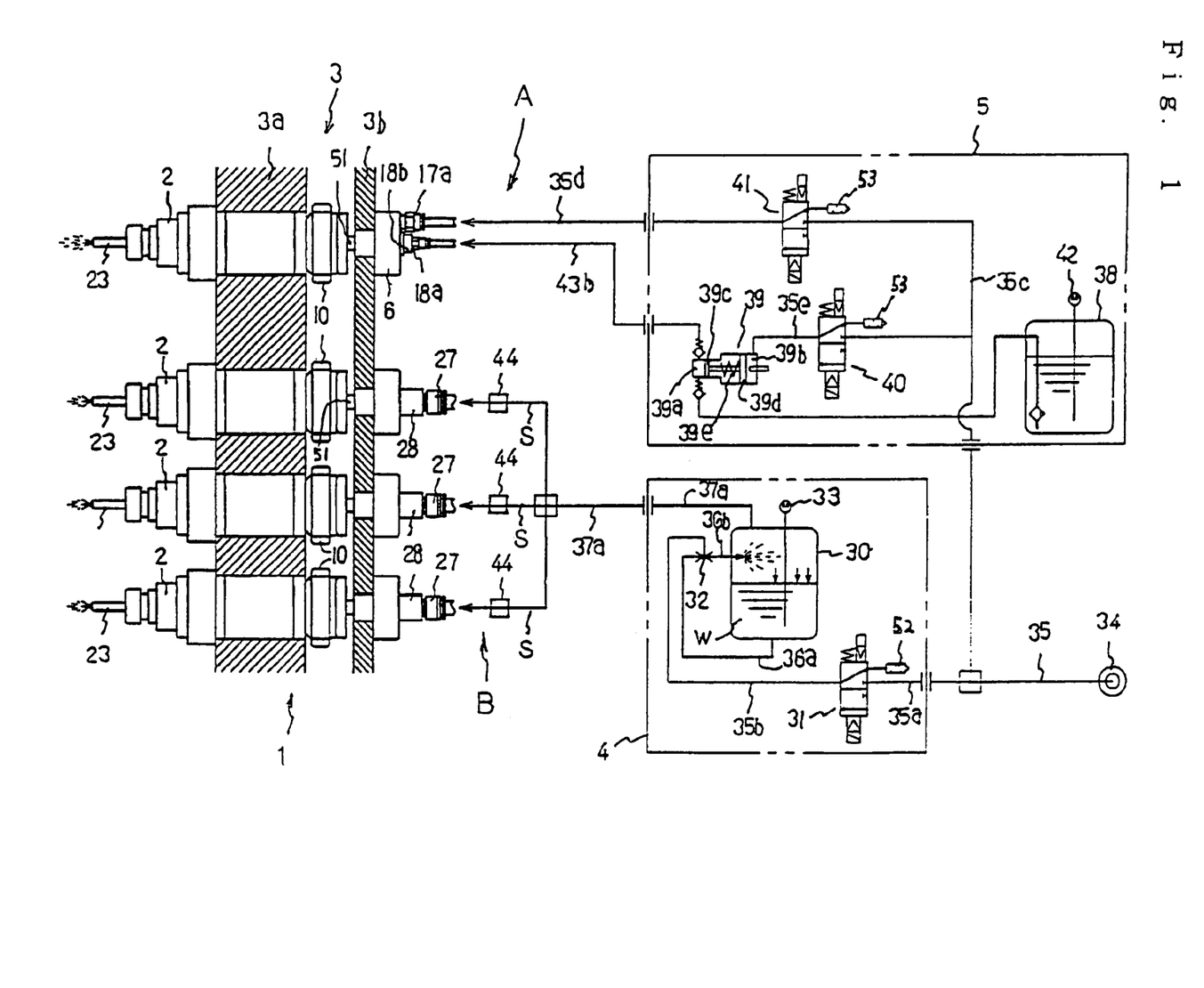
FIG. 1 is a whole view of a multispindle machine tool related to the present invention.

In FIG. 1, 1 is a part of a spindle head with a plurality of spindles 2, relatively displaced to a work Numeral 4 is an external mist feed device, and 5 is an external gas-liquid separate feed device.

A spindle head 3 has a head frame comprising a main body frame 3a and a support frame 3b. The supporting frame 3b is integrally provided behind the main body frame 3a. The spindles 2 are rotatably provided on the main body frame 3a in a longitudinal direction. Supporting members 6 are fixed to the support frame 3b correspondent to the spindles 2 so as to support passage means 51 inserted to the centers of the spindles 2.

The peripheral structure of each of the spindles 2 will be explained as follows.

Figure 2:
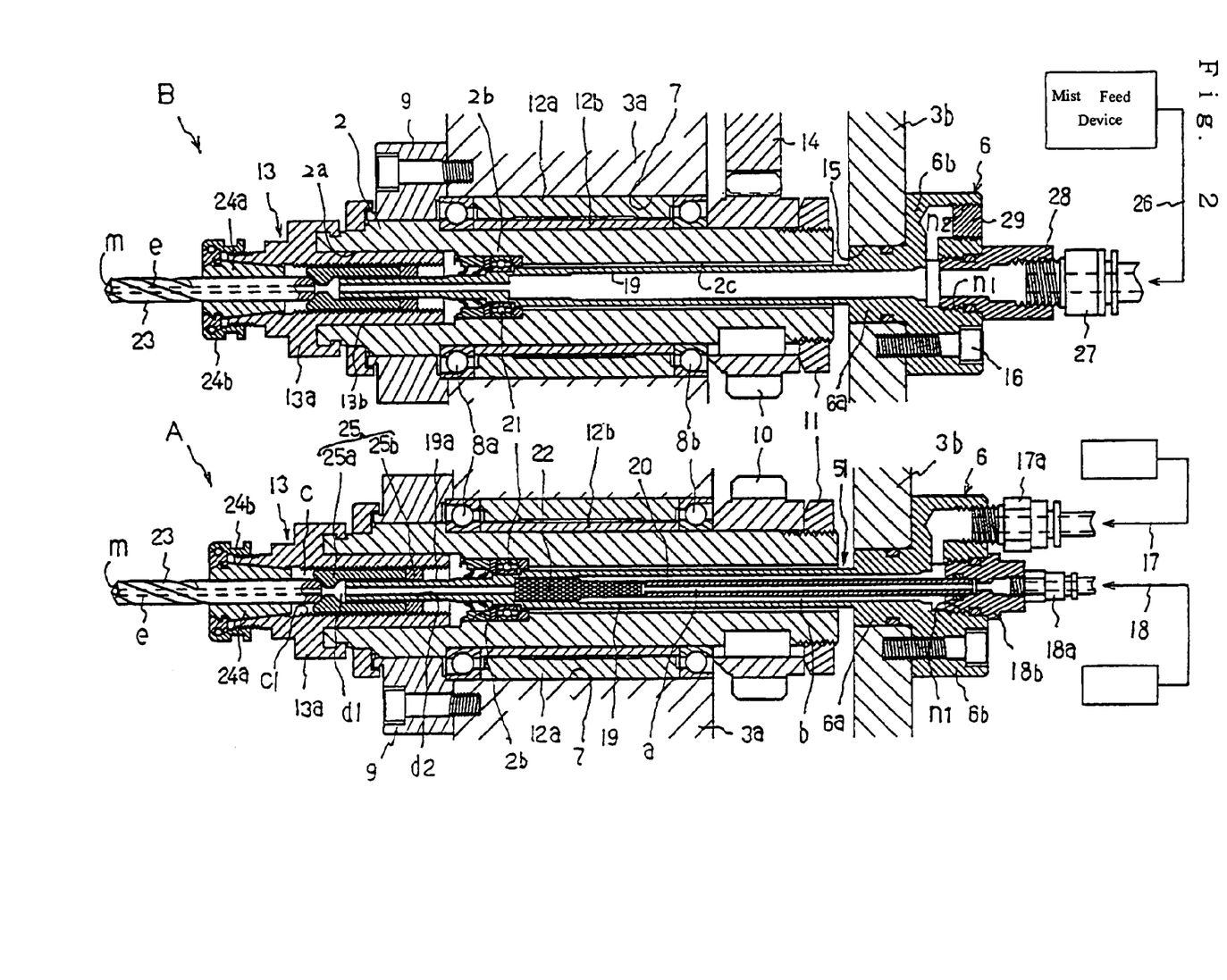
FIG. 2 is a cross-sectional view at the side sight showing a part of a spindle head of the machine tool.

Through holes 7 are respectively provided to the main body frame 3a correspondent to the spindles 2, and therein, the spindles 2 are inserted through ball bearings 8a, 8b so as to rotate at a fixed position.

In this case, 9 is a ring member fixedly bolted to the front end surface of the main body frame 3a, and 10 is an input gear externally inserted and fixedly keyed to the rear end surface of each of the spindles 2. A nut body 11 is screwed to the rear end of the spindle 2, regulating the input gear 10 slipping out from the spindle 2. Cylindrical spacers 12a, 12b regulate the longitudinal position of the ball bearings 8a, 8b.

The spindle 2 has an interfitted hole 2a with a straight cylindrical female surface at the center of the tip and two straight double-level center holes 2b, 2c continuously. A tool holder 13 is composed chiefly of a holder main body 13a, and an interfitting part 13b of a part of the holder main body 13a is internally interfitted to the interfitted hole 2a.

A transmission gear 14 is rotatably supported to the main body frame 3a and engaged with the input gear 10, receiving rotations from a not-illustrated motor.

A through hole 15 is provided to the support frame 3b just behind the spindle 2, and therein, a cylindrical interfitting part 6a of the supporting member 6 is interfitted, and a main body 6b thereof is fixed to the support frame 3b through a bolt 16. On the rear end of the cylindrical member 6, a splicing fitting 17a for connecting a compressed air feed line 17 and a fitting member 18b having a splicing fitting 18a for connecting a liquid lubricant feed line 18 are screwed respectively.

An outside cylindrical member 19 non-contacting with the spindle of the passage means 51 is non-rotatably inserted into the center hole 2c of the spindle 2 concentrically. An inside cylindrical member 20 is concentrically arranged inside the outside cylindrical member 19. An inner hole of the inside cylindrical member 20 serves as a liquid passage a, and a space between the inside cylindrical member 20 and the outside cylindrical member 19 serves as a compressed air passage b.

Between the front part of the outside cylindrical member 19 and the center hole 2b, a ball bearing 21 for rotatably supporting the outside cylindrical member 19 is provided. The rear end of the inside cylindrical member 20 is liquid-tightly inserted into a center hole of the fitting member 18b, and the front end thereof is connected to the rear end of a mist generator 22 non-rotatably inserted into the tip of the outside cylindrical member 19.

The mist generator 22 is what atomizes liquid lubricant fed through the liquid passage a by an energy of compressed air fed through the compressed air passage b, which has been already well known.

The tool holder 13 comprises a collet chuck 24 for fastening and fixing the periphery of a cutter 23 located to the front part of the holder main body part 13a, a center hole c having a thread part c1 at the center, and a cutter longitudinal position engaging means 25 provided into the center hole c.

The cutter longitudinal position engaging means 25 comprises a cutter engaging member 25a inserted into the center hole c and touched to the rear end surface of the cutter 23 and a male thread member 25b for adjusting the longitudinal position of the cutter engaging member 25a. Longitudinal through holes d1, d2 are respectively provided to the centers of the cutter engaging member 25a and the male thread member 25b. Into the through holes d1 d2, the tip of a mist outlet part 19a forming the front end of the outside cylindrical member 19 is rough-airtightly inserted.

The collet chuck 24 comprises a collet 24a surrounding the periphery of the cutter 23 and an operation nut part 24b for displacing the collet 24a rearward.

The cutter 23 has a straight mist passage e at the center.

Next, work machining through the spindles 2 with the structure shown in FIG. 2 will be explained.

Each of the spindles 2 is transmitted the rotations of the not-illustrated motor by the transmission gear 14 and the input gear 10, rotating at a specified position of the main body frame 3a as being supported by the ball bearings 8a, 8b. The rotations of the spindle are transmitted to the cutter 23 through the holder main body 13a and the collet chuck 24. In this case, the cutter longitudinal position engaging means 25 also rotates integrally with the holder main body 13a.

On the other hand, since the front end of the outside cylindrical member 19 is supported by the ball bearing 21 and the rear end thereof is supported integrally with the support frame 3b, the outside cylindrical member 19 keeps non-rotatable even if the spindle 2 rotates. Therefore, the mist generator 22 provided integrally with the outside cylindrical member 19 can keep non-rotatable.

Compressed air and liquid lubricant are fed to the passage means 51 from the compressed air feed line 17 and the liquid lubricant feed line 18, respectively. According to this, the compressed air is fed to the mist generator 22 through the compressed air passage b between the outside cylinder 19 and the inside cylindrical member 20. The liquid lubricant is fed to the mist generator 22 through the liquid passage a of the inside of the inside cylindrical member 20.

The mist generator 22 makes lubricant mist due to a reciprocal action between the compressed air and the liquid lubricant, spouting it from the tip forward. Thus spouted lubricant mist jets from an outlet opening m of the tip of the cutter 23 through the mist outlet part 19a, the longitudinal through hole d1 of the cutter engaging member 25a and the mist passage e of the cutter 23.

Under this state, the spindle head 3 is displaced so as to approach to the work, and therefore, the tip of the cutter of each of the spindles 2 is pressed to the work. In this case, the lubricant mist jetted from the tip of the cutter 23 lubricates and cools a fricative part between the cutter 23 and the work.

Accordingly, the structure of the spindle 2 in FIG. 2A corresponds to an internal mist generating system; wherein the lubricant mist is produced inside the spindle 2 and jets from the tip of the cutter 23.

Next, an explanation about an embodiment that the spindle 2 with the structure shown in FIG. 2A is corresponded to the external mist feed system will be as follows.

An operator takes away the supporting member 6 from the fitting member 18b due to canceling their screwed fitting, and thereafter, gives rearward ejection force to the fitting member 18b. Accordingly, the inside cylindrical member 20 and the mist generator 22 are pulled out the outside cylindrical member 19 without regulation of the other members inside the spindle 2.

As shown in FIG. 2B, the other fitting member 28 screwed by the splicing fitting 27 of the lubricant mist feed line 26 is screwed into the thread hole n1 screwed by the fitting member 18b.

Besides, the splicing fitting 17a is taken away from the supporting member 6 by canceling their screwed fitting. Thereafter, as shown in FIG. 2B, a blank cap 29 is screwed into the thread hole n2 screwed by the splicing fitting 17a.

Thereafter, as same as the spindle 2 in FIG. 2A, each of the spindles 2 is rotated, and under the rotations, the lubricant mist is fed into the outside cylindrical member 19 with the structure shown in FIG. 2B from the outside of the spindle 2 through the lubricant mist feed line 26.

The lubricant mist fed into the spindle 2 jets from the mist outlet m of the tip of the cutter 23 through a mist outlet part 19a, the center hole d1 of the cutter engaging member 25a, and the mist passage e.

Under this state, the spindle head 3 is displaced so as to approach to the work, and the tip of the cutter 23 of each of the spindles 2 is pressed thereon. In this case, though the lubricant mist jetted from the tip of the cutter 23 is very light in comparison with the lubricant mist in case of the internal mist feed system (for example, about 1/10 in the quantity of lubricant), it acts so as to lubricate and cool.

Accordingly, the structure of the spindle 2 in FIG. 2B corresponds to the external mist feed system, wherein the lubricant mist is fed into the spindle 2 from the outside and jets from the tip of the cutter 23.

An explanation about an external mist feed device 4 is as follows.

The external mist feed device 4 comprises a lubricant mist feed tank 30, a compressed air feed switching valve 31, an external mist generating part 32, and a level gage 33 as shown in FIG. 1.

The compressed air is fed into the external mist generating part 32 from a compressed air feed power supply 34 as a factory facility through the compressed air lines 35, 35a,35b and the compressed air feed switching valve 31 switched to an open side. Therefore, liquid lubricant w inside the lubricant mist feed tank 30 is withdrawn by the compressed air energy through a suction line 36a. The withdrawn liquid lubricant is made into lubricant mist by the energy. The lubricant mist is fed into an upper closed space inside the lubricant mist feed tank 30 through a discharge line 36b.

A lubricant mist feed line 37a elongates from the lubricant mist feed tank 30 so as to feed the inside lubricant mist to the outside. The level gage 33 detects the height of oil level of liquid lubricant w inside the lubricant mist feed tank 30.

A silencer 52 reduces noises due to the compressed air flowing out from the compressed air feed switching valve 31 to the air.

A complete set of external mist feed device 4 is formed to one machine tool. When the compressed air feed switching valve 31 is switched to the open side, the external mist feed device 4 starts feeding the lubricant mist to the outside through the lubricant mist feed line 37a, whereas it is switched to the closed side, it stops the feeding.

An explanation about the external gas-liquid separation feed device 5 will be as follows.

The external gas-liquid separation feed device 5 is provided with a lubricant tank 38, a lubricant feed pump 39, a pump drive direction-switching valve 40, a compressed air feed switching valve 41 and a level gage 42.

The lubricant tank 38 receives liquid lubricant.

The lubricant feed pump 39 comprises a lubricant cylinder chamber 39a, a drive cylinder chamber 39b opposing to the lubricant cylinder chamber 39a, pistons 39c, 39d corresponding to these chambers 39a, 39b, and an compressed spring 39e for pressing the pistons 39c, 39d to the cylinder chambers 39c, 39d in a specified direction. Here, the pistons 39c, 39d are integrally connected. The lubricant cylinder chamber 39a has check valves to a suction port and a draft port for lubricant.

A compressed air feed line 35c feeds compressed air from the compressed air feed power supply, connected to the compressed air feed switching valve 41 and the pump drive direction-switching valve 40. In this case, when the compressed air feed switching valve 41 is switched to the open side, it starts feeding the compressed air to the outside through the compressed air feed line 35e, whereas when it is switched to the dosed side, it stops the feeding A not-illustrated control device repeatedly switches the pump drive direction-switching valve 40 at good timing. When the pump drive direction-switching valve 40 is switched to one side, it feeds the compressed air into the drive cylinder chamber 39b through the compressed air feed line 35e, whereas when it is switched to the other side, the compressed air inside the cylinder chamber 39b flows out to the air therethrough.

A lubricant suction line 43a connects the lubricant tank 38 and the suction port of the lubricant cylinder chamber 39a. A liquid lubricant feed line 43b is provided to feed liquid lubricant from the draft port of the lubricant cylinder chamber 39a toward the outside.

A silencer 53 reduces noises due to the compressed air flowed from the compressed air feed switching valve 41 and the pump drive direction-switching valve 40 to the air.

The external gas-liquid separation feed devices 5 of only the same number as spindles 2 are formed until they are used first at least. When the compressed air feed switching valve 41 is switched to the open side, each external gas-liquid separation device 5 starts feeding the compressed air to the outside through the compressed air feed line 35d. On the other hand, when the valve 41 is switched to the closed side, the separation device 5 stops feeding the compressed air therefrom. Besides, when the pump drive direction-switching valve 40 is repeatedly switched, the lubricant feed pump 39 feeds an arbitrary quantity of lubricant toward the outside through the liquid lubricant feed line 43b.

A space between the spindles 2 and the external mist feed device 4 or the external gas-liquid separation feed device 5 is a piping area for connecting these, and pipes are suitably exchanged according to whether the spindles 2 correspond to the external gas-liquid separation feed device of the internal mist generating system or the external mist feed device of the external mist feed system.

Next, an example of case using the multispindle machine tool related to the invention for practical work machining will be explained.

When setting up at first in a machining spot of work, each of the spindles 2 are connected to a different external gas-liquid separation feed device 5. In this case, in each of the spindles 9, as the spindle 2 in FIG. 1A or 2A, the end of the compressed air feed line 35d of each external gas-liquid separation feed device 5 is connected to the splicing fitting 17a, and the end of the liquid lubricant feed line 43b is connected to the splicing fitting 18a.

Under the state, a work is practically machined by the spindles 2, and the optimized flow of lubricant mist jetted from the tip of the cutter 23 is measured. The measurement is so accomplished that the timing of repeat switching the pistons 39c, 39d of the lubricant feed pump 39 during machining is suitably changed by adjusting an adjustment knob of a not-illustrated control device, and therefore, the flow of lubricant mist jetted from the tip of the cutter 23 of the spindles 2 is optimized, and the position of the knob is read when thus adjustment is finished.

The optimized flow of lubricant mist about each of the spindles 2 is understood by reading the position of the knob. Then, according to the optimized flow scale, it is decided that the spindles 2 are corresponded to either the external mist feed system or the internal mist generating system.

In this decision, when the optimized flow scale is smaller than a constant degree, the external mist feed system is selected, whereas when it is larger than the constant degree, the internal mist generating system is selected.

The spindles 2 selecting the internal mist generating system remain in being connected to the external gas-liquid separation devices 5. On the other hand, in each spindle 2 selecting the external mist feed system, the fitting member 18b is removed from the supporting member 6, the mist generator 22 and the inside cylindrical member 20 are pulled out rearward, and the different splicing fitting 28 and the blank cap 29 are installed as shown in FIG. 2B.

Thereafter, as shown in FIG. 1, the end of the mist feed line 37a of the external mist feed device 4 is connected to the splicing fitting 27. In this case, when a plurality of spindles 2 select the external mist feed system, the mist feed line 37a is branched as shown in FIG. 1 and thus branch lines are connected to the splicing fittings 27 corresponding to the spindles 2.

Besides, when the optimized flow of lubricant mist of each of the spindles 2 selecting the external mist feed system is different, in response to necessity, an orifice as a flow control means 44 is inserted in the middle of each branch line s connected to each of the spindles 2 in accordance with the optimized flow scale as shown in FIG. 1. Because the optimized flow of lubricant mist can be fed into the spindle 2 only by connecting the branch line s to the splicing fitting 27 of the spindle.

The cross section of passage of the orifice 44 can be decided by theoretical calculation or experimental data in advance, preferably, a corresponding table between the optimized flow of lubricant mist of a spindle 2 and the size of the orifice 44 is made in advance. Besides, a flow-regulating valve may be used in stead of the orifice 44.

Thereafter, the external mist feed device 4 and the external gas-liquid separation feed device 5 of each of the spindles 2 are operated, and the lubricant mist jets from the tip of the cutter 23 of the spindle with an optimum flow. Mist pressure inside the mist feed tank 30 of the external mist feed device 4 is optionally changed by changing the pressure of the compressed air fed from the compressed air power supply 34.

Figure 3:
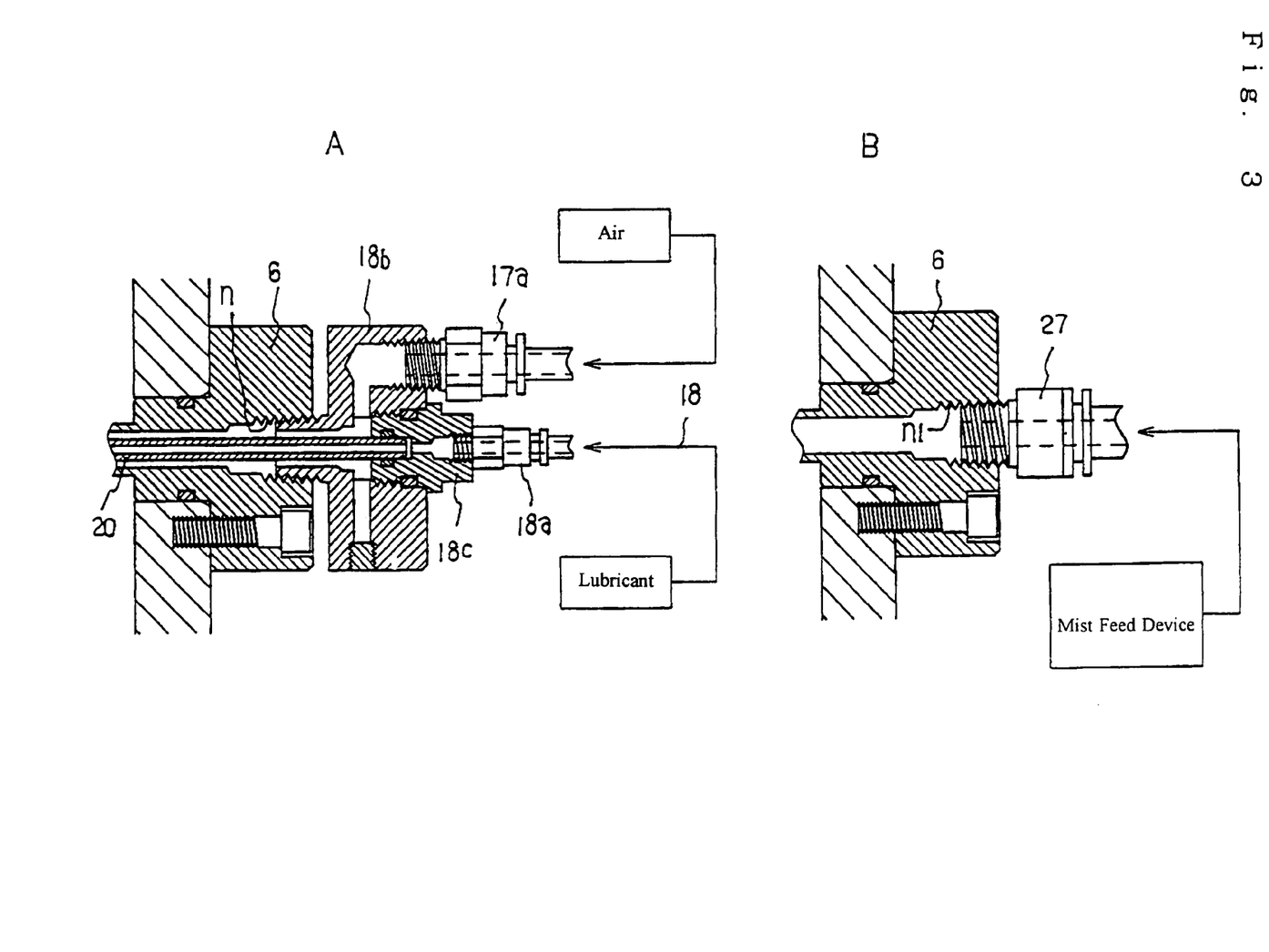
FIG. 3 is a view showing a modification of the rearward structure of a spindle of the machine tool.

FIG. 3 shows a modification of the circumference of the supporting member 6 in the above-mentioned embodiment. In the state that the spindle 2 corresponds to the internal mist generating system, as shown in FIG. 3A, a comparatively large fitting member 18b is screwed to the supporting member 6. On the fitting member 18b, a small fitting member 18c screwed on a splicing fitting 18a connected to the liquid lubricant feed line 18, and a splicing fitting 17a connected to the compressed air feed line 17 are screwed. The inside cylindrical member 20 is insertedly fixed to the small fitting 18c. On the other hand, in the state that the spindle 2 corresponds to the external mist feed system, as shown in FIG. 3, the splicing fitting 27 is installed to the thread hole n1.

Figure 4:
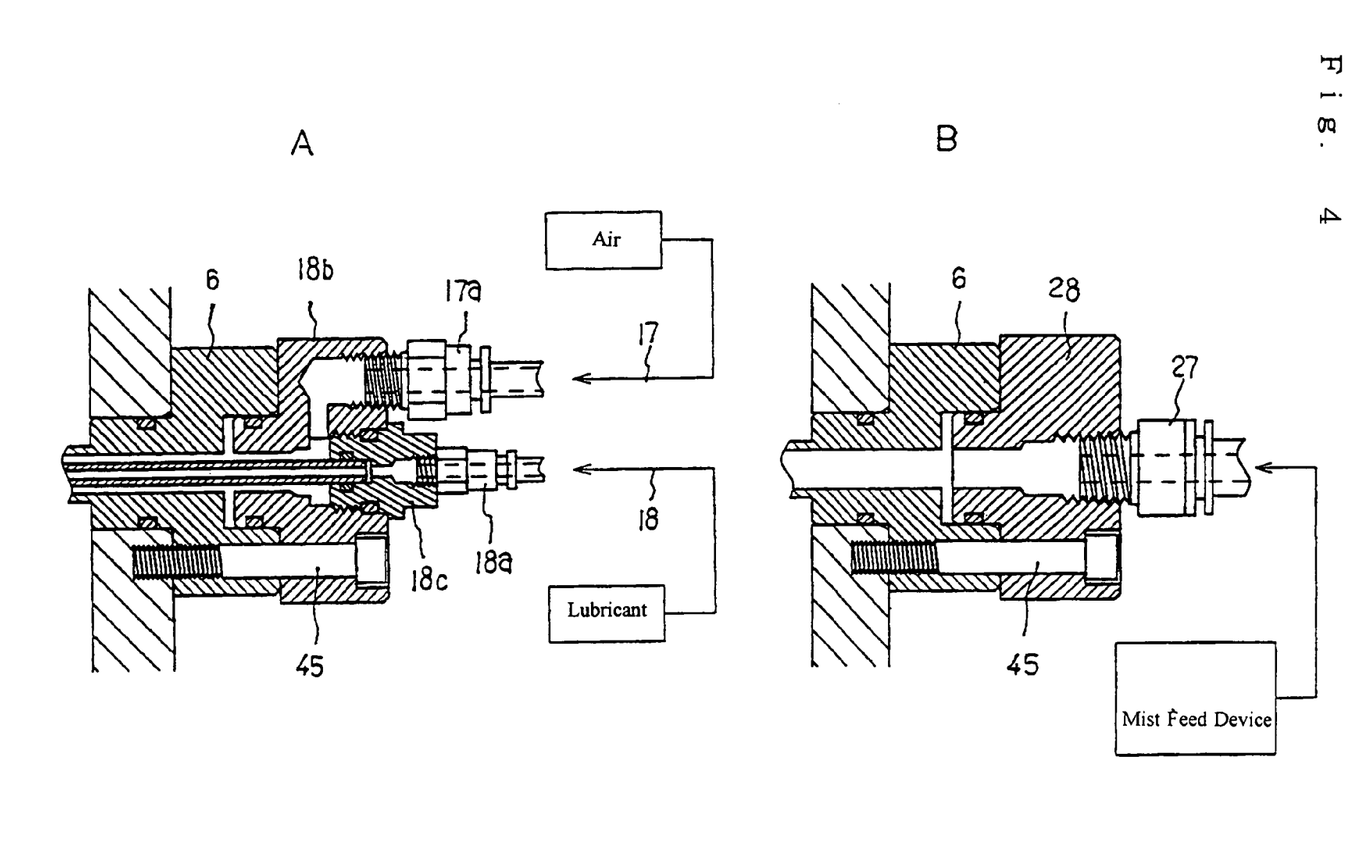
FIG. 4 is a view showing an another modification of the rearward structure of a spindle of the machine tool.

FIG. 4 shows a modification of the circumference of the supporting member 6 in the above-mentioned embodiment. In the state that the spindle 2 corresponds to the internal mist generating system, as shown in FIG. 4A, the comparatively large fitting member 18b is screwed to the supporting member 6 through a bolt 45, and the other features are substantially same in FIG. 3A. On the other hand, in the state that the spindle 2 corresponds to the external mist feed system, as shown in FIG. 4B, a comparative large fitting member 28 is screwed to the supporting member 6 through the bolt 45, and the splicing fitting 27 is screwed to the fitting member 28.

According to the above-mentioned invention, the following effects will be obtained.

According to the invention, since the mist generators and the inside cylindrical members are installed so as to be withdrawn rearward with the outside cylindrical members held in fixed state, an operation for optimizing the lubricant mist jetted from the spindles can be accomplished easily, rapidly and at low cost in various work machining.

The spindles corresponding to the fitting members can be changed from the internal mist generating system to the external mist feed system by the above-mentioned easy operation.

In each of the spindles, selecting or changing the internal mist generating system or the external mist feed system can be accomplished conveniently.

Besides, since suitable pipe arrangements are formed between each spindle and the feed device of the outside, the spindle feeds lubricant mist from the external mist feed device or the external gas-liquid separation feed device. Accordingly, in the practical various work machining, the operation for optimizing the flow of lubricant mist jetted from the spindle can be accomplished easily, rapidly and at low cost.

Moreover, in the practical various work machining, the optimum flow of lubricant mist in each spindle can be understood rapidly and exactly by the external gas-liquid separation feed device. Accordingly, it is decided rapidly which of the above-mentioned two systems is corresponded to the spindle, and the spindle can be corresponded to the selected system conveniently and rapidly. Furthermore, the flow regulating means can much strictly optimize the flow of lubricant mist of the spindles corresponding to the external mist feed system. According to this, in the practical various work machining, the operation for optimizing the flow of lubricant mist jetted from the spindles can be accomplished easily, rapidly and at low cost.

What is claimed is:

1. A multispindle machine tool comprising:
a spindle head (3) having a front and comprising a main frame body (3a) and a support frame (3b) provided behind the main frame body;
a plurality of spindles (2) rotatably arranged on the main frame body in a longitudinal direction;
supporting members (6) installed on the support frame correspondent to each of the spindles and supporting passage means (51), said passage means inserted into the centers of the spindles;
said passage means including outside cylindrical members (19) fixed to the support frame (3b) and inserted into center holes of the spindles;
mist generators (22) for generating lubricant mist in the spindles, located inside the outside cylindrical members; and
said passage means also including inside cylindrical members (20) fixed on the tips of the mist generators, and inside cylindrical members and mist generators being installed so as to be able to be withdrawn backward from the spindles while the outside cylindrical members are held in a fixed state in the spindles,
wherein under a state that the inside mist generators (22) are not withdrawn from the spindles, the mist generators (22) can generate the lubricant mist due to separately feeding compressed air and liquid lubricant from the outsides of the spindles (2) through the outside cylindrical members (19) and the inside cylindrical members (20), and said lubricant mist flows out from the tips of cutters (23) fixed on the tips of the spindles at the front of the spindle head,
and under a state that the mist generators (22) and the inside cylindrical members (20) are withdrawn from the outside cylindrical members (19) to the outsides of the spindles, externally generated lubricant mist is fed from the outsides of the spindles into the spindles (2) through the outside cylindrical members (19) to jet out the externally-generated lubricant mist from the tips of the cutters (23).

2. A multispindle machine tool as claimed in claim 1,
wherein rear ends of the outside cylindrical members (19) are supported on the support frame (3b) through the supporting members (6),
fitting members (18b) connected to rear ends of the inside cylindrical members (20) are removably bolted to the supporting members,
and under a state that the fitting members are removed from the supporting members, rearward withdrawing force is provided to the fitting members, whereby the mist generators (22) and the inside cylindrical members (20) are withdrawn to the outsides of the spindles, without regulation of relative displacement with respect to the outside cylindrical members (19) and the spindles (2).

3. A multispindle machine tool comprising:
a spindle head (3) having a front and comprising a main frame body (3a) and a support frame (3b) provided behind the main frame body;
a plurality of spindles (2) rotatable arranged on the main frame body in a longitudinal direction;
supporting members (6) installed on the support frame correspondent to each of the spindles and supporting passage means (51), said passage means inserted into the centers of the spindles; and
said passage means including outside cylindrical members (19) fixed on the support frame (3b) and inserted into center holes of the spindles;
wherein in some of the outside cylindrical members, mist generators (22) for generating lubricant mist in the spindles are provided thereinside, in an installed state, and inside cylindrical members (20) are fixed on the tips of the mist generators and said cylindrical members and mist generators are installed so as to be able to be withdrawn backward from the spindles while the outside cylindrical members are held in a fixed state in the spindles, and under the installed state, the mist generators (22) can generate the lubricant mist due to separately feeding compressed air and liquid lubricant from the outsides of the spindles (2) through the outside cylindrical members (19) and the inside cylindrical members (20), and said lubricant mist flows out from the tips of cutters (23) fixed on the tips of the spindles at the front of the spindle head,
and wherein in others of the outside cylindrical members, externally-generated lubricant mist is fed from the outsides of the spindles to the inside thereof, and said externally-generated mist flows out from the tips of the cutters (23) fixed on the tips of the spindles (2).

4. A multispindle machine tool as claimed in claim 3,
wherein in the case of said others of the outside cylindrical members, an external mist feed device (4) for feeding the externally-generated lubricant mist from the outside of the spindles is provided to feed said externally-generated mist to each of said others of the outside cylindrical members (19), and in the case of the some of the outside cylindrical members, there are inside cylindrical members (20) having the mist generators (22) fixed on the tips located inside the outside cylindrical members, an external gas-liquid separation feed device (5) for feeding liquid lubricant and compressed air separately is provided, and the external mist feed device and the external gas-liquid separation feed device (4, 5) are selectively connected to spindles (2) through pipe arrangements.

5. A method of optimizing lubricant mist flow for each spindle of a multispindle machine tool as claimed in claim 4, wherein an internal mist generating system includes the arrangement wherein the inside cylindrical members (20) and mist generators (22) are installed within the outside cylindrical member (19), and wherein an external mist generating system is for the arrangement wherein the inside cylindrical members (20) and the mist generators (22) are withdrawn from the spindles, the method comprising:

selecting the internal mist generating system to all spindles (2);

feeding optimum lubricant mist by providing the external gas-liquid separate feed device (5) corresponding to the spindles;

measuring the flow of the lubricant mist in each of the spindles;

deciding whether to select either the internal mist generation system or the external mist generating system for the spindles according to the measurement;

feeding the externally-generated liquid lubricant from the external mist feed device (4) through pipe arrangement to each of the spindles selecting the external mist feed system; and intervening flow restriction means (44), in the pipe arrangements, for feeding an optimum quantity of lubricant mist to the spindles.

6. A method of optimizing lubricant mist flow for each spindle of a multispindle machine tool as claimed in claim 3, wherein an internal mist generating system includes the arrangement wherein the inside cylindrical members (20) and mist generators (22) are installed within the outside cylindrical members (19), and wherein an external mist generating system is for the arrangement wherein the inside cylindrical members (20) and the mist generators (22) are withdrawn from the spindles, the method comprising:

selecting the internal mist generating system to all spindles (2);

feeding optimum lubricant mist by providing an external gas-liquid separate feed device (5) corresponding to the spindles;

measuring the flow of the lubricant mist in each of the spindles;

deciding whether to select either the internal mist generation system or the external mist generating system for the spindles according to the measurement;

feeding the externally-generated liquid lubricant from an external mist feed device (4) through pipelines to each of the spindles selecting the external mist feed system; and intervening flow restriction means (44), in the pipelines, for feeding an optimum quantity of lubricant mist to the spindles.

* * * * *